Nov. 26, 1935.   H. LAW   2,022,426
SPRING SUSPENSION FOR VEHICLES
Filed May 16, 1934   2 Sheets-Sheet 2

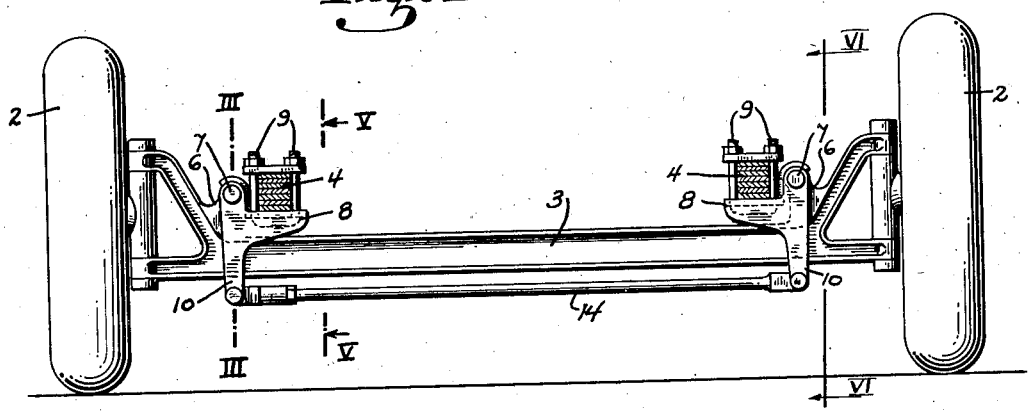
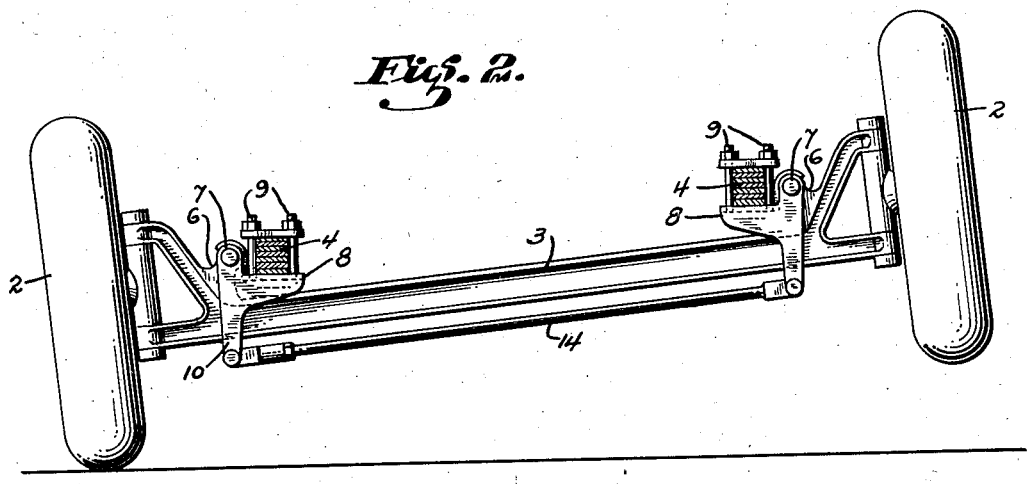
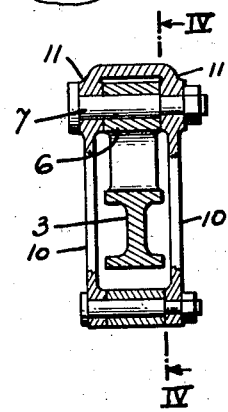
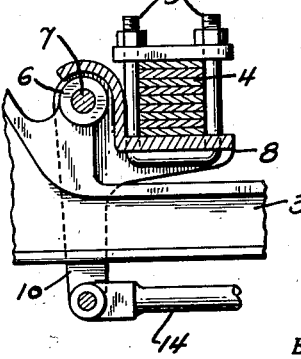
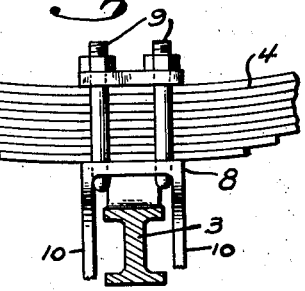

INVENTOR.
Harry Law.
BY Townsend & Loftus.
ATTORNEYS.

Patented Nov. 26, 1935

2,022,426

UNITED STATES PATENT OFFICE 2,022,426

SPRING SUSPENSION FOR VEHICLES

Harry Law, Snelling, Calif.

Application May 16, 1934, Serial No. 725,913

6 Claims. (Cl. 267—19)

This invention relates to the attachment of axles of automobiles and like vehicles to their springs, and particularly to a connection whereby torsional stresses or transverse deformation of the springs, which results when the axle is moved out of its normal horizontal position, are reduced to a minimum.

In spring suspensions in general use on automobiles and like vehicles the leaf springs are usually attached at their ends to the frame by one or more links or shackles and to the axle by clips or bolts. These connections are rigid when lateral movement of the spring is considered and as such produce torsional stresses and twisting or transverse deformation of the spring when the axle is moved out of its horizontal plane. This torsional or twisting action materially reduces free movement and flexing of the spring and, furthermore, is the main source of spring leaf breakage.

The object of the present invention is generally to improve and simplify the construction and operation of spring suspension of the character described; to provide a suspension whereby torsional stresses and transverse deformation is substantially prevented; and further, and more specifically stated, to provide a spring supporting saddle which is pivoted to the axle and in which a pair of saddles are connected by a tie rod so that movement of one spring and supporting saddle is transmitted to the other to maintain parallelism between the springs and to cause equalization of stresses.

The invention is shown by way of illustration in the accompanying drawings, in which—

Fig. 1 is an end view of a vehicle axle, supporting wheels and springs, the springs being shown in cross section, said view also illustrating the pivoted saddles to which the springs are secured.

Fig. 2 is a view similar to Fig. 1, showing the change in position of the spring supporting saddles when the axle becomes inclined with relation to its normal horizontal plane.

Fig. 3 is an enlarged cross section taken on line III—III of Fig. 1.

Fig. 4 is a cross section taken on line IV—IV of Fig. 3.

Fig. 5 is an enlarged cross section taken on line V—V of Fig. 1.

Figure 6:
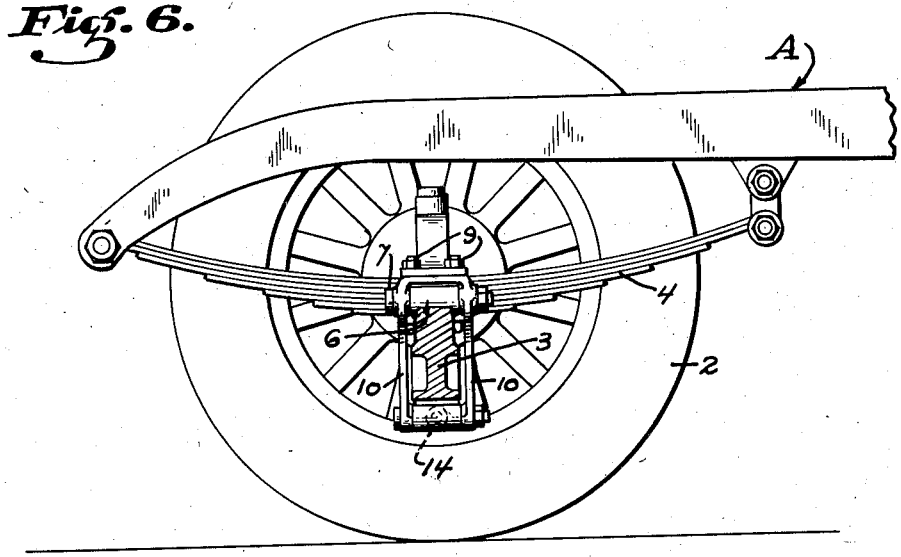
Fig. 6 is an enlarged cross section taken on line VI—VI of Fig. 1.
Figure 7:
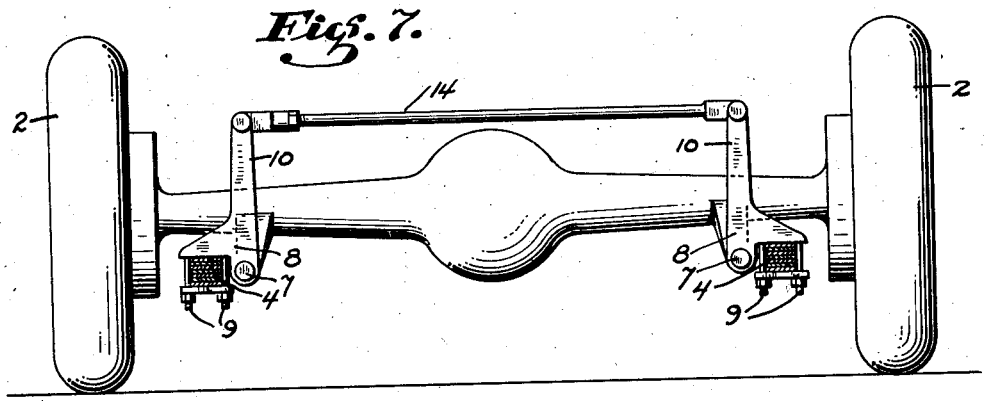
Fig. 7 is a view similar to Fig. 1 but showing a modified form of spring mounting.

Referring to the drawings in detail, and particularly Figs. 1 to 6, A indicates the main frame of an automobile or like vehicle, 2 the wheels, 3 the axle, and 4 the springs interposed between the axle and frame.

The manner in which the springs 4 are attached to the axle 3 forms the subject matter of the present application and is best illustrated in Figs. 1 to 5. The axle is provided with a bearing lug 6 at each end and extending therethrough is a pivot pin 7, and supported by the pivot pin is a spring supporting saddle generally indicated at 8.

Figure 8:
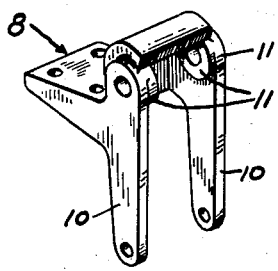
Fig. 8 is a perspective view of one of the spring supporting saddles.
Figure 9:
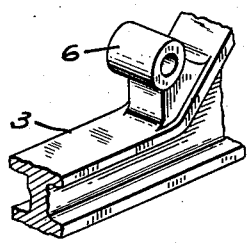
Fig. 9 is a perspective view showing one of the saddle bearing lugs formed on the axle.

This saddle is best shown in Fig. 8. It consists of the plate to which the leaf spring is clamped and rigidly secured by U-bolts, or the like, indicated at 9 see Figs. 4 and 5. At one end of the plate are formed a pair of crank arms 10. These arms are extended to form bearing lugs 11 and it is through these lugs that the pin 7 extends. The saddle is accordingly pivotally secured to the axle and as the springs 4 are rigidly secured to the saddle plates pivotal movement of the saddles will take place whenever the axle becomes inclined to its normal horizontal plane, as shown in Fig. 2.

In the present instance the tie rod 14 is pivotally attached at its opposite ends to the crank arm 10, hence if one of the springs 4 is compressed and the saddle supporting the same swings with relation to the axle, such swinging movement will be transmitted through the tie rod to the opposite saddle and the saddles will swing in unison, one in an upward direction and one in a downward direction, or vice versa. Lateral stresses are to this extent more or less equalized and the springs are automatically maintained in parallelism. Torsional stresses and transverse deformation of the springs are substantially eliminated. By this construction it is obvious that the springs are relieved of twisting and binding action and as such the leaves forming the spring are free to move with relation to each other, thereby producing a greater flexibility and better riding qualities; also, as twisting and torsional stresses are substantially absent breakage of the individual leaves due to such stress is eliminated and the strain on the axles and other connections is very materially reduced.

Having thus described my invention, what I claim and desire to secure by Letters Patent is:—

1. The combination with the axle and the springs of a vehicle, of a saddle member pivotally secured to each end of the axle and to which the springs are secured, said saddle members being adapted to swing about their pivots during flexing of the springs, and means for transmitting swinging movement of one saddle member to the other.

2. The combination with the axle and the springs of a vehicle, of a saddle member pivotally secured to each end of the axle and to which the springs are secured, said saddle members being adapted to swing about their pivots during flexing of the springs, a crank arm on each saddle member, and a tie rod pivotally connecting the crank arms.

3. In a spring suspension of the character described the combination of a body and an axle, a pair of springs interposed between the axle and the body, a saddle member pivotally secured to each end of the axle, means rigidly securing the springs to the respective saddle members, said saddle members being adapted to swing about their pivots during flexing of the springs, and means for connecting the saddle members whereby they will swing in unison.

4. The combination with the supporting springs interposed between the body and the axle of a vehicle, of a pivotally mounted member at each end of the axle to which the springs are rigidly secured, said members swinging about their pivots when the springs flex, and means connecting the pivoted members to cause them to swing about their pivots in unison.

5. In vehicle spring suspension, the combination with an axle and a pair of springs, of a saddle forming a seat for each spring, means pivoting the saddles to the axle out of line with the vertical center of the spring seats, and means connecting the saddle members whereby they will swing in unison.

6. In vehicle spring suspension, the combination with an axle and a pair of springs, of a saddle forming a seat for each spring, pivot means offset from the vertical center of the springs and supporting the saddles on the axle whereby the weight on the springs will tend to swing the saddles on their pivots, a tie rod connecting the saddles normally preventing such swinging and causing the saddles to swing in unison when the axle is tilted from the horizontal.

HARRY LAW.